United States Patent [19]

Mishra

[11] Patent Number: 5,006,239

[45] Date of Patent: Apr. 9, 1991

[54] APPARATUS FOR TREATMENT OF OILY SLUDGE

[75] Inventor: Surendra K. Mishra, The Woodlands, Tex.

[73] Assignee: Tetra Technologies, Inc., The Woodlands, Tex.

[21] Appl. No.: 512,608

[22] Filed: Apr. 23, 1990

Related U.S. Application Data

[63] Continuation of Ser. No. 201,522, Jun. 2, 1988, abandoned, which is a continuation-in-part of Ser. No. 933,119, Nov. 20, 1986, Pat. No. 4,851,123.

[51] Int. Cl.$^5$ .................... C02F 1/40; B01D 17/032
[52] U.S. Cl. .................... 210/181; 210/202; 210/299; 210/512.1; 210/540
[58] Field of Search ............ 210/181, 182, 202, 221.1, 210/221.2, 295, 297, 299, 499, 512.1, 538, 540, 776, 784, 804, 806

[56] References Cited

U.S. PATENT DOCUMENTS

| | | | |
|---|---|---|---|
| 2,759,607 | 8/1956 | Boyd et al. | 210/53 |
| 2,983,677 | 5/1961 | Boyd et al. | 210/44 |
| 3,407,934 | 10/1968 | Ejecfors | 210/73 |
| 3,487,003 | 12/1969 | Baillie et al. | 208/11 |
| 3,502,575 | 3/1970 | Hepp et al. | 210/42 |
| 3,707,464 | 12/1972 | Burns et al. | 210/44 |
| 3,723,309 | 3/1973 | Garcia | 210/44 |
| 3,764,008 | 10/1973 | Darley et al. | 210/73 |
| 3,864,251 | 2/1975 | Cymbalisty | 210/44 |
| 3,884,803 | 5/1975 | Traylor | 210/44 |
| 4,001,114 | 1/1977 | Joseph et al. | 210/44 |
| 4,203,837 | 5/1980 | Hoge et al. | 210/44 |
| 4,432,887 | 2/1984 | Zajic et al. | 252/331 |
| 4,555,345 | 11/1985 | Yoshida | 210/705 |

OTHER PUBLICATIONS

F. F. Aplan, "Flotation," Encyclopedia of Chemical Technology, Kirk–Othmer, vol. 10, 3rd ed, 1980, pp. 523–547.

J. Leja, "An Outline of a Mineral Flotation System, Definitions," Surface Chemistry of Froth Flotation, pp. 4–14.

A. M. Gaudin, H. L. Miaw, & H. R. Spedden, "Native Floatability and Crystal Structure," 2nd Int. Congress Surf. Chem. 1957, pp. 202–219.

R. R. Klimpel, "Froth Flotation: The Kinetic Approach".

W. L. Chen, "Cyclones with Plain Water for Fine-Coal Cleaning", Coal Age, Aug. 1964, pp. 90–92.

Dorr-Oliver, DSM ® Screens for the Food Industry (1980) Brochure.

Primary Examiner—Tom Wyse
Attorney, Agent, or Firm—Arnold, White & Durkee

[57] ABSTRACT

A novel apparatus removes hydrophobic oil from solid particulates in oily sludge waste such as waste material from oil refineries, drilling fluids or muds brines, and other chemical wastes which have solid particulates contaminated with oil. The process involves separation of different components of the sludge on the basis of their size, density and physio-chemical differences. Coarse particulates are removed with the use of screening systems such as sieve bends or vibro-sieves. Oil is removed from these coarse particulates with water rinsing. Oil is removed from fine particles by gravity separation, which separates the sludge into high and low density fractions. Froth flotation is used to remove hydrophilic materials from the high density fraction. Froth flotation may involve the use of frothing agents, surface modifying agents and surfactants, the selection of which generally depends on the composition of the sludge, the physical and chemical characteristics of the sludge, and the desired separation composition.

9 Claims, 2 Drawing Sheets

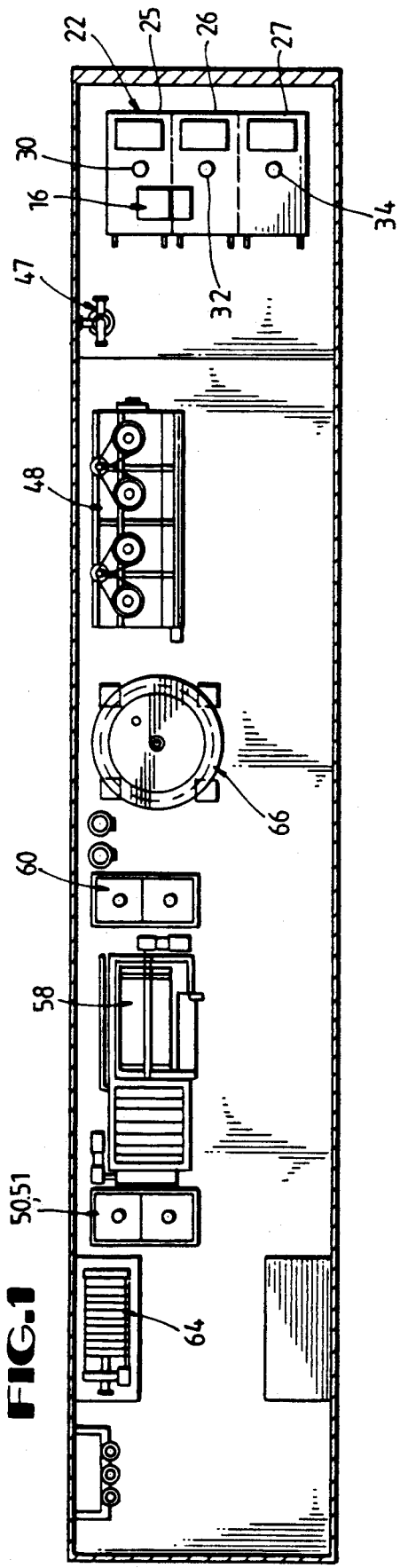
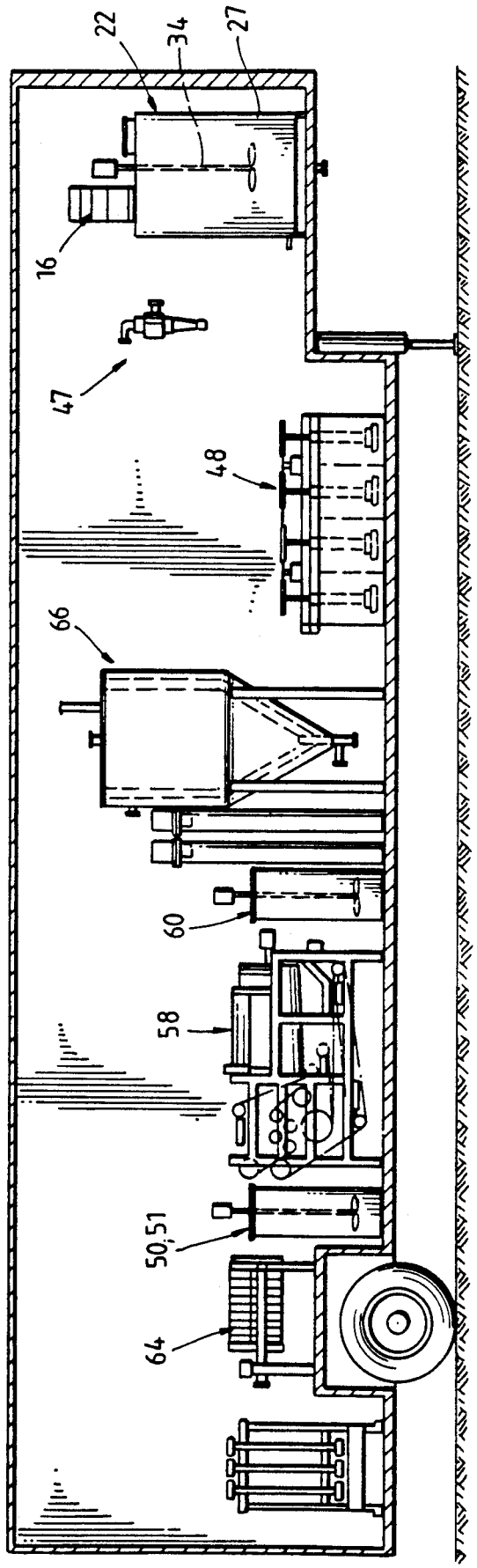

APPARATUS FOR TREATMENT OF OILY SLUDGE

This application is a continuation of application Ser. No. 201,522, filed on June 2, 1988, abandoned which is a continuation-in-part of Ser. No. 933,119, filed Nov. 20, 1986 now U.S. Pat. No. 4,851,123.

BACKGROUND OF THE INVENTION

This application is a continuting application of Application Ser. No. 06/933,119, filed Nov. 20, 1986 and entitled "SEPARATION PROCESS FOR TREATMENT OF OILY SLUDGE".

Waste materials ("oily sludge") from oil refineries, drilling operations, and other chemical and industrial operations may contain particulates having different physical and chemical compositions, hydrophobic oil fractions and water. The particulates themselves are commonly hydrophilic minerals, but may include some hydrophobic particulates. 'Hydrophobic oil' generally includes hydrocarbon oils and hydrophobic organic compounds having alkyl, aryl, or alkyl-aryl groups. 'Oil' as used herein includes materials that are generally hydrophobic, not only petroleum or petroleum-based substances, but also oils derived from plants and vegetables and synthetic oils.

Solid-liquid separation processes have been used to remove solids from liquid phases with varying degrees of success. Currently, industry uses expensive filtration and centrifuge operations as well as heat and chemical treatments to treat oily sludge and other waste materials. A major problem faced by industry, however, is the separation of hydrophobic oil from oily sludge. More specifically, the liberation of oil from the surfaces of the solid particles, especially where the oil has to some extent been adsorbed.

It is known that various screening systems are useful to separate solid particulates based on size differences. Also, in some instances water rinsing can be used to remove oil from coarse particles; however, rinsing generally does not remove oil from fine particulate solids where there is significant adsorption.

Existing filtration and centrifuge processes accompanied by heat and chemical treatments can reduce the oil content of the solid particulates to a certain extent. But filtration and centrifuge operations are relatively expensive unit processes. Moreover, heat and chemical treatments have a further adverse influence on the economics of the operation. Therefore, it is an object of this invention to develop alternatives which can either replace or complement the aforementioned processes for the treatment of oily sludge.

SUMMARY OF THE INVENTION

This invention is based on the discovery of a process and apparatus for removing hydrophobic oil from oily sludge containing solid particulates and water. In various aspects, the process and apparatus are based on differences in particle sizes, densities, and hydrophobicity of components. The process also contemplates use of surfactants, surface modifying agents, and frothing agents to aid in removal of the oil and other hydrophobic components from the sludge. The apparatus illustrated in FIGS. 1, 2 and 3 is a preferred embodiment of the apparatus.

Accordingly, the invention is directed to a process. In one aspect, the process involves a screening and rinsing step for removing substantially hydrophilic coarse particles. In another aspect, the process involves a density separation step for separating low and high density fractions. In still another aspect, the process involves a froth flotation step to remove substantially hydrophobic oil and particulates from the mixture. Separation of oil and particulates based on hydrophobicity can be aided by adding chemicals such as surfactants, surface modifying agents and frothing agents. The configuration of the process can be varied to achieve the most efficient and economical result.

The invention is also directed to an apparatus for separating substantially hydrophobic material from a mixture of hydrophobic oil, solid particulates and water. In a broad aspect, the apparatus includes a density separator and a froth flotator.

A specific embodiment of the invention additionally comprises a size separator for separating coarse particles from fine particles. Preferably, the size separator is located upstream from the density separator. In other aspects, the apparatus includes a water rinser and a sieve bend size separator.

Still another specific embodiment of the invention comprises an apparatus for separating substantially hydrophobic material from a mixture of hydrophobic material, solid particles and water, comprising: (a) a size separator for separating the coarse particles from the fine particles; (b) a water rinser for separating the hydrophobic materials and fine particles from the coarse particles; (c) a density separator for separating the high density materials in the mixture from the low density materials in the mixture; and (d) a froth flotator for separating the hydrophobic materials from the hydrophilic materials. As discussed above, the configuration can be varied depending on the type of particles in the sludge and the particle size distribution in order to achieve the most efficient and economic result. A preferred embodiment of the invention is disclosed below.

BRIEF DESCRIPTION OF THE DRAWINGS

FIGS. 1 and 2 show, respectively, a top view and a side view of an embodiment of the invention. These figures illustrate the separate component parts and their relative positions. The various pipes and valves connecting the parts are shown in FIG. 3.

DETAILED DESCRIPTION

A. The Process

Figure 3:
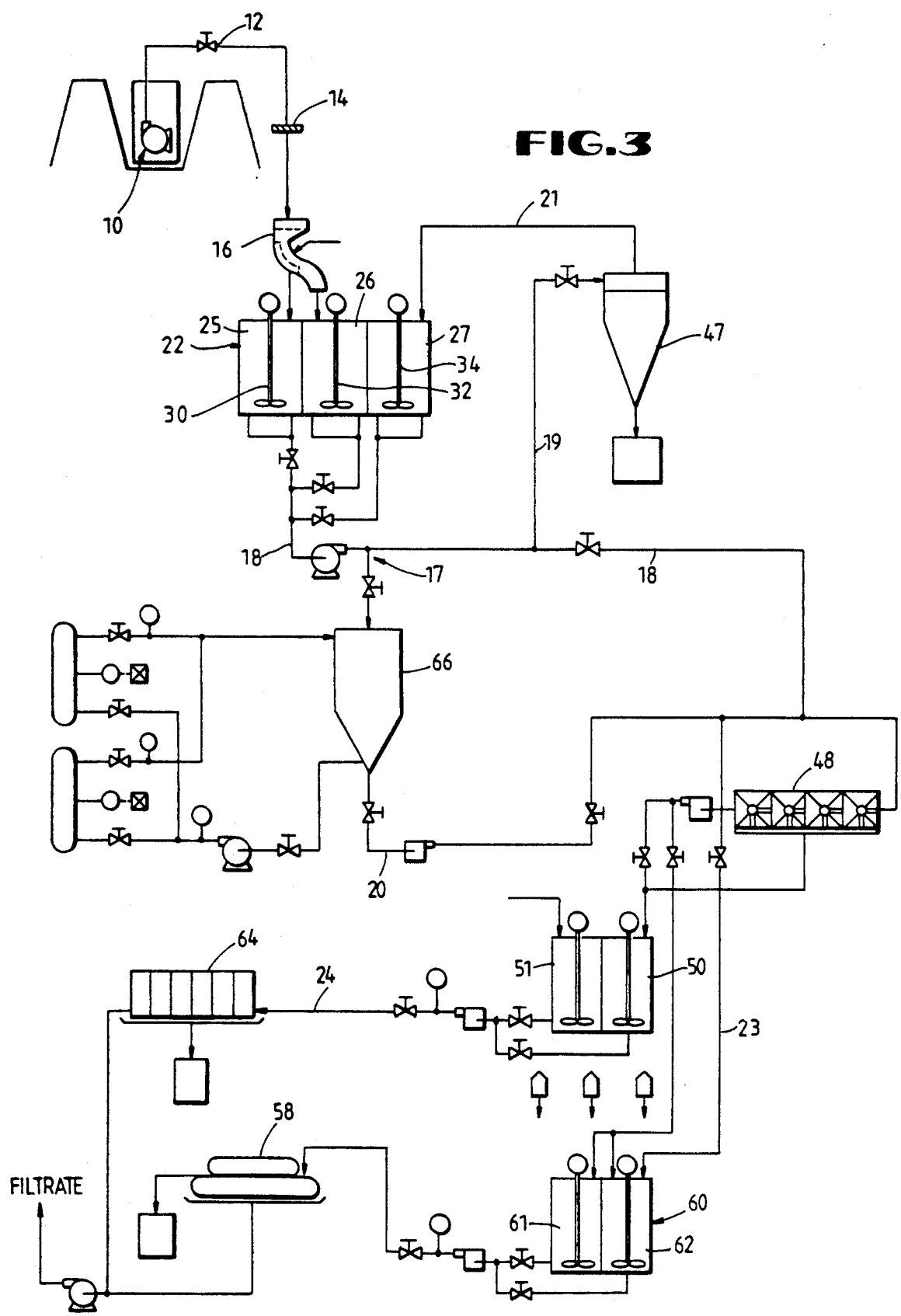
FIG. 3 is a flow diagram depicting the interrelationship of the component parts shown in FIGS. 1 and 2.

In a general aspect, the present invention comprises a method of separating the different components of an oily sludge based on their particle size, density, and physio-chemical, i.e., interfacial properties. Specifically the process addresses the problem of separating oil from the surface of solid particulates in an aqueous mixture, i.e., an oily sludge.

The oily sludge or waste material is understood to contain water, and may be referred to as a "mixture". Enough water should be in the mixture at all times to maintain flowability. Thus, for an extremely viscous sludge, fresh or recycled water can be added to improve flowability.

When oil mixes with water and other solid particulates, the oil may become adsorbed on the surface of the particulates. Rinsing with water can occasionally remove the oil from relatively coarse particles. But rinsing has little effect on oil adsorbed on fine particulates. Therefore, more processing is needed to remove oil from the sludge. Because of the high solids content of the oily sludge, oil removal is not easily accomplished using a centrifuge. In one aspect of this invention, screening in combination with water rinsing may be used to remove coarse particles from fine particulates and surface oil. In another aspect, fine particulates can be separated into light and heavy fractions, with oil and low density particulates being classified as the light fraction and high density particulates classified as the heavy fraction. In still another aspect of the invention, froth flotation can be used, whereby relatively hydrophobic particulates and hydrophobic oil are removed as froth product and relatively hydrophilic particulates remain with the water phase and are removed as tailings. The froth product contains oil and particulates that are sufficiently hydrophobic to adhere to air bubbles. The tailings contain hydrophilic particulates that do not adhere to air bubbles.

The first stage in the treatment process is preferably the separation of over-sized or coarse particles from under-sized or fine particulates ("fines") and surface oil by screening and rinsing with water. Rinsing the sludge with water during the screening process facilitates the separation of the coarse and fine particles while at the same time removing the oil from the surface of the coarse particles. This stage is especially important when the oily sludge contains a large number of coarse particles. This stage may be omitted if the particles are too fine to be screened. The exact size of the coarse particles to be removed in the screening stage is of minor importance, but is generally greater than about 0.1 mm in diameter.

The term "over-sized" means that there is a screening device that separates or "sizes" the particles, i.e., a device that prevents the over-sized or coarse particles from remaining with the "under-sized" or fine particles, which should be capable of passing through the screen along with the hydrophobic materials and liquids. Usually the hydrophobic materials are not over-sized. If they are, this size separation stage is largely ineffective and may be omitted.

Hydrophilic particulates removed from the sludge at this stage are generally large enough that absorbed oil can be rinsed off their surfaces with water. Most mineral particulates in an oily sludge are hydrophilic in nature. This screening stage is generally not effective, however, for particulates substantially hydrophobic in nature, such as coal or talc. In that case, water rinsing does not remove the hydrophobic surface oil. Particles whose surface oil cannot be rinsed off with water should remain with the fines for future processing. Any conventional apparatus, such as a vibro-sieve, can be used in this first stage.

Next, the fines are preferably separated according to their relative densities in a density separation step. Accordingly, the fines mixture (containing fine particulates and oil) is fed to equipment for separating high density materials (heavy fraction) from low density materials (light fraction), e.g., a gravity separation system or a hydrocyclone. Here, it is understood that only two essential density components are produced. Although a whole range of densities may be present, the objective is to draw a line between the materials based on their densities. In the density separation stage, gravity separation is recommended if the particles are relatively coarse, and if the density difference is relatively great so that the particles are easy to separate. This could be the case if the sludge contained coal or talc, and if the screening stage were omitted.

By controlling the density separation operation, the composition of the light fraction component (low density) and heavy fraction component (high density) can be varied. In general, it is preferred that the light fraction include mainly hydrophobic oil and hydrophobic particulates, while the heavy fraction be comprised of predominantly hydrophilic particulates with some hydrophobic oil component and oil-coated fine particulates. An advantageous feature of this invention is that some hydrophobic oil can be separated from hydrophilic particulates based on density differentials, i.e., before froth flotation. This may provide a significant savings in chemical additives, which would otherwise be required to separate the hydrophobic oil.

Fines in the heavy fraction may contain some hydrophobic component. In one aspect of the invention, the hydrophobic component may be recovered using a screening system such as a sieve bend, vibro-sieve, or some similar screen system. A Dorr-Oliver DSM Screen is one device that can be used at this stage. Water sprays are preferably used to rinse off remaining fines and surface oil in the heavy fraction from coarse particle surfaces. These fines are then combined with the light fraction from the density separation step, e.g., hydrocyclone or gravity separation system. The resultant light fraction stream is then conditioned with surfactants for the next stage.

The next stage separates the hydrophobic from hydrophilic components of the light fraction, based on physiochemical differences, i.e., interfacial property differences of the particulates. A preferred process is froth flotation whereby the light fraction is fed to a flotation cell. In this regard, the teachings of K.L. Sutherland and I.W. Wark, *Principles of Flotation,* Australasian Inst. of Mining and Metallurgy (Melbourne 1955) 4–15, are incorporated by reference. In froth flotation, air bubbles are created through agitation or by the introduction of forced or induced air. These air bubbles adhere to the hydrophobic particulates and oil droplets and, due to buoyancy, float to the surface where they are skimmed off as froth product. The hydrophilic component of the mixture remains in the flotation cell as tailings and is continuously discharged for further processing.

"Hydrophobic" and "hydrophilic" as used herein are relative terms. The objective is to remove hydrophobic oil as froth product. Accordingly, "hydrophobic" oil is oil that adheres to the air bubbles and becomes part of the froth. Mineral particulates such as calcite may also be removed as a desired hydrophobic froth product after appropriate surfactant treatment. The operator must decide the line that is to be drawn between "hydrophobic" and "hydrophilicp". Accordingly, the operator can control the composition of the froth product by adding surfactants, surface modifying agents, and frothing agents.

The froth product contains hydrophobic fractions and some carry-over water. This hydrophobic fraction includes oily materials and hydrophobic particulates, the dominate phase being the oily materials. For further separation of oil from the solid and water phases, the froth product may require heat and further surfactant treatments. The tailings contain a negligible oily fraction. However, the tailings can be treated by further froth flotation as a scavenger process using the similar reagent scheme of surface modifying agents, surfactants, and frothing agents.

The final tailings, substantially void of oily component, are flocculated using chemical additives. These additives can be either organic or inorganic. Organic polymer additives can be anionic, cationic, or nonionic, separately or in combination. Their selection depends on the nature of the surface charge of the particulates and the electrolytic environment. For example, if particulates are negatively charged, cationic polymer additives are preferred. The flocculated tailings may then be dewatered using filtration or centrifuge systems.

The filter cakes produced from the filtration or centrifuge systems may be combined with the coarse solid fractions from the screening and sieve bend systems in the circuit and discharged as solid waste. The filtrate from the filtration or centrifuge systems, void of oil content, ma be discharged as water fraction.

The surface modifying agents used in the froth flotation step generally include electrolytes (inorganic or organic) that adsorb at the solid-liquid or liquid-air interfaces. These surface modifying agents change the interfacial chemistry of the system. Selected surface modifying agents can promote the adsorption of other surfactants at the aforementioned interfaces. Surface modifying agents from other selected groups can prevent their adsorption. A wide range of inorganic and organic electrolytes are part of this general group of surface modifying agents. Examples are alkali metal carbonates, hydroxides, phosphates, silicates (of sodium, potassium or lithium groups), carboxylates, sulfates, sulfonates, phosphates, phosphonates, amines of various alkyl, aryl, or alkyl-aryl groups and their esters. Acids and alkalis are also part of this general group of surface modifying agents.

Whether or not the surface modifying agent is added depends on the physio-chemical and chemical characteristics of the solid particulates. These characteristics are discussed in depth in D.W. Fuerstenau and T.W. Healy, "Principles of Mineral Flotation", Absorptive Bubble Separation Techniques 92–131, *Academic Press* (New York 1972), the teachings of which are hereby incorporated by reference. In some cases, no surface modifying agent is needed; for example, if the sludge consists of pure sand, water and relatively little hydrophobic oil. On the other hand, appropriately selected surface modifying agents are needed when relatively fine particulates are present. The appropriate surface modifying agent is normally chosen on a case-by-case basis, depending on the interfacial properties of the solid and the chemical properties of the sludge.

In addition to chemical surface modifying agents, heat and aerobic heterotrophic micro-organisms may also be used to optimize the process. Heat may be supplied in the form of steam. Examples of micro-organisms that can serve as surface modifying agents are Flavobacterium species, Pseudomonas species, Coryne bacterium species, and Nocardia species. These help in the adsorption of the oily component from the solid surface.

The surfactants which are used for the froth flotation step enhance hydrophobicity, and thereby the flotability of particulates or oil droplets. They may be anionic, cationic, nonionic, or amphoteric in nature. The choice of these surfactants depends upon the type of separation desired and the composition of the oily sludge to be treated. The following publications contain potentially helpful information in choosing a surfactant, and are hereby incorporated by reference: M.C. Fuerstenau and B.R. Palmer, "Anionic Flotation of Oxides and Silicates", Flotation A.M. Gaudin Memorial Volume ed. by M.C. Fuerstenau, Vol. 1 AlME publ. (1976) 148; R. Klimpel, "The Engineering Characterization of Flotation Reagent Behavior", Proceedings of Mill Operators Conference, Australasian Inst. of Mining & Metallurgy (1982) 297. Available surfactants are also discussed by R.R. Klimpel, "Frother Flotation: The Kinetic Approach" presented at Mintek 50 Johannesburg, South Africa, March, 1984.

Surfactants used in froth flotation can be divided into two groups. The first group includes amines, carboxylates, sulfates, sulfonates, phosphates, phosphonates, and thiolates of alkyl, aryl, or alkyl-aryl groups or their esters. The second group comprises alcohols, alkoxy compounds, glycols, and glycol ethers. The major function of surfactants from the first group is to render the particulate or oil droplet surfaces hydrophobic. The second group of surfactants acts as an air bubble stabilizer which in turn stabilizes the froth produced in the process. The second group is also known as "frothing agents".

Various other embodiments of the invention are included herein. One embodiment involves a process for removing hydrophobic oil from a mixture which includes oil and hydrophilic particles, wherein the oil is partially adsorbed to the particles. The process comprises modifying the surface of the hydrophilic particles in an amount sufficient to promote desorption of the oil from the particles. The process also includes adding a surfactant in an amount sufficient to promote flotation of the hydrophobic oil; and froth flotating the mixture to promote the separation of the hydrophobic oil from the mixture. This process may also include the additional step of removing the hydrophobic oil which has been separated due to froth flotation.

In another aspect, the invention involves a process for treating sludge. Generally, the sludge includes both coarse and fine particles mixed with oil. When the invention is applied to sludges from large lagoons, it should preferably be equipped to handle a variety of particle sizes. For this reason size separation is an important step in a preferred embodiment. Some parts of the lagoon may have uniformly fine particles, other parts may have sludge with uniformly coarse particles. Still other parts, however, may have a wide distribution of different particle sizes, i.e., a coarse/fine mix. One preferred embodiment of the apparatus, described below, includes a size separator designed to handle this coarse/fine particle mix.

Accordingly, in this aspect the process comprises size separating the coarse particles from the fine particles, wherein the coarse and fine particles are hydrophilic and have oil adsorbed on their surfaces; washing the coarse particles to promote removal of adsorbed oil from the coarse particles; and treating the fine particles by froth flotation to promote the removal of adsorbed oil from the fine particles. With some sludges, size separation may be accomplished to a certain extent by gravity separation. Gravity separation classifies the particles based on their density. When the particles are sufficiently large, and the adsorbed oil does not appreciably affect their relative densities, the gravity separation step classifies the particles based on size. However, when the particles are fairly small, gravity separation usually is affected by the amount of adsorbed oil on each particle.

Accordingly, particles cannot generally be classified according to size when they are below a certain size.

In a preferred aspect, the process may also include the additional step of modifying the surfaces of the fine particles to promote the desorption of oil adsorbed thereon; and adding a surfactant to the sludge to promote flotation of hydrophobic particles and oil.

B. The Apparatus

A preferred embodiment of the apparatus is shown in FIGS. 1, 2 and 3. The illustrated apparatus basically comprises a number of components, each of which, standing alone, is conventional in the art. FIG. 3 shows the preferred configuration, i.e., the way in which the components are preferably connected. By "connected" it is meant that they are interrelated (either directly or indirectly) in such a way that slurry can be passed from one to the other by a transport means such as a line or pipe.

This particular pilot plant apparatus is based on 2 gallons/minute and uses a 1.5 inch line. A full-scale sludge treatment plant could probably treat about 150 gallons/minute. The design parameters should generally be scaled up accordingly.

The homogenizing pump 10 may be a conventional recirculating pump used for pumping the slurry, i.e., the oily sludge. The pump is not shown in FIGS. 1 and 2 but only in FIG. 3. Preferably, the capacity of the homogenizing pump 10 is about 45 gallons per minute. The pump should be positioned in the waste pit or container that holds the oily sludge. A line, such as a pipe or flexible hose, connects the homogenizing pump 10 to the rest of the system.

Downstream from the pump 10 and attached to the line is a valve 12 which regulates the flow of the slurry to about two gallons per minute. As discussed above, this flow rate may be varied depending on treatment capacity.

The oily sludge comprises particulates of different physical and chemical compositions as well as hydrophobic oil fractions and water. The particulates themselves are generally hydrophilic minerals, but may include some hydrophobic particulates. If the oily sludge in the waste pit is too thick, water may be added to provide a slurry which will flow through the lines.

Further downstream, the slurry is directed to the size separator 16, usually an important aspect of the apparatus. Size separation is an essential step when a large fraction of the mixture includes coarse particles associated with hydrophilic materials. The size separator 16 is preferably a sieve bend such as a hydrosieve, which is conventional in the art.

The principal function of the size separator is to segregate the fines from the coarse particles. In a preferred embodiment, the hydrosieve 16 can be manipulated to "size separate" the particles in the slurry, i.e., to separate the solid particles on the basis of particle size. Accordingly, upon passing through the size separator 16, the slurry stream will divide into an underflow stream, designated as the "fines" stream, and an overflow stream, designated as the "coarse" stream. The water and other liquids will generally go into the fines stream.

Preferably, before separating the slurry into a "fines" particles component and a "coarse" particles component, the slurry is first passed through a trash screen 14. The trash screen 14 can be seen in FIG. 3 and is preferably located downstream from the valve 12 and upstream from the size separator 16. Typically, the trash screen 14 is about ¼ inch mesh. Different sized trash screens can be used depending on the composition of the sludge. Although not always necessary, the trash screen 14 is a preferred part of the apparatus for treatment of waste materials which contain solid particles that would obstruct or interfere with the rest of the system. In most cases, the trash screen 14 should not be used where the oily sludge does not have a significant proportion of particles with diameters greater than ¼ inch.

In addition to a separator screen, inherently a part of most size separators, the size separator 16 preferably includes a water rinser, which is usually an external component attached in the proximity of the size separator. The separator screen is important because of the need to delineate the coarse particles from the fine particles, i.e., the need to segregate the "fines" component from the "coarse" component. This designation of "coarse" and "fine" particles is relative and varies with the particle size distribution of the oily sludge. It also depends on the discretion of the operator.

Typically, the screen in the size separator 16 should be such that the coarse particles are greater than about 0.1 mm in diameter. However, the screen may also be of a size that removes particles greater than about 0.5 mm, 1 mm or 2 mm, depending on the particle size distribution in the slurry.

In some selected instances, the size separator 16 may be either removed from the system or bypassed by the slurry so that the coarse particles remain with the fines. For example, if a significant amount of hydrophobic oil is found on the surface of the coarse particles, the coarse particles should not be screened out but rather should be left with the fines. Naturally, some of this hydrophobic oil can be removed by rinsing. But often, some of the adsorbed oil remains with the particles. In these cases, other aspects of the invention can generally provide separation of the adsorbed hydrophobic oil from the oily sludge. For example, if sodium silicate is added prior to froth flotation, the adsorbed oil is replaced by the sodium silicate at the particle surface. The oil can then be separated by froth flotation.

Preferably, the slurry is simultaneously rinsed by a rinser as it is being screened by the size separator 16. In one embodiment, the size separator comprises a water rinser. Although not shown in the drawings, any conventional water rinser capable of spraying water on the particles being screened is contemplated. If the oily sludge is thicker than desired, this water rinser may also be used to dilute the sludge and thereby create a more manageable slurry. Preferably, hot water is used for rinsing.

The next component in the preferred embodiment is the surge tank or the conditioning tank 22. The apparatus illustrated in FIGS. 1, 2 and 3 has three cells 25, 26, 27 for receiving the slurry. Each cell 25, 26, 27 is equipped with an electrically-powered mixer or rotor 30, 32, 34 for maintaining a particulate dispersion so that solids in the slurry do not settle to the bottom of the cell.

Each cell preferably has a specific function. Conditioning cell 25 receives the fines, i.e., the underflow, from the size separator 16. Conditioning cell 26 receives the coarse particles, i.e., the overflow, from the size separator 16. Conditioning cell 27 receives the recycle stream from the density separator 47, which is preferably a hydrocyclone. With several cells, the system can be regulated to accommodate a broad range of oily sludges. Differing levels of hydrophobicity and wide ranges of particle sizes can be handled by the apparatus.

Generally speaking, the recycle stream entering the conditioning cell 27 includes the light fraction, i.e., low density materials. This light fraction may contain fine particles, and even sometimes coarse particles where size separation is omitted or is less effective. However, in a preferred embodiment, the light fraction will contain primarily the fine particles and the low density hydrophobic materials.

In a preferred embodiment an opening is provided at the top of each conditioning cell 25, 26, 27, so that conditioning additives such as surface modifying agents and pH adjusting chemicals may be introduced into each cell.

Exit lines from each conditioning cell 25, 26, 27 are combined into a single main line 18. Each cell has a valve, which regulates the flow from each cell 25, 26, 27 to the main line 18. The main line 18 leads to the froth flotator 48. A first branch line 17 leads to the heat treatment system 66 while a second branch line 19 leads to the hydrocyclone 47. Another line 20 leads from the heat treatment system 66 to the froth flotator 48. Line 21 leads from the density separator 47 to the conditioning cell 28, and carries the recycle stream.

In a broad aspect, valves may be provided in the lines at various points between the components where it is appropriate and desirable to do so. A discussion of the exact locations of these valves is unnecessary as such will be readily apparent to those skilled in the art. It can be seen from FIG. 2 that valves should be placed where they are needed to regulate and/or isolate the various stream flows.

In one preferred embodiment, a valve is provided on each line, e.g., the main line 18, the branch lines, and the other lines 20, 21 as well. Generally, only one series of lines should be used at once. Thus, in most cases, the slurry will not be fed to the froth flotator 48 through line 18 when lines 17, 19, 20 or 21 are in use. In most cases, the slurry is directed to the froth flotator directly through line 18. Or, the slurry may be exclusively directed to the froth flotator by way of the heat treatment system 66 (lines 17-20). Alternatively, the valves in lines 17 and 19 may be closed so that the entire slurry will pass through the density separator 47. The recycle rate plus the initial feed rate is preferably approximately the same as the total flow rate from the surge tank 22. The main line 18 valve is preferably at a point downstream from the branch line connections.

In the apparatus illustrated in the drawings, a density separator 47 such as a hydrocyclone is provided primarily to separate the fines stream into a heavy fraction and a light fraction. Assuming a significant portion of oil is removed by water spraying, the density separator 47 should be employed to remove hydrophobic materials from the fine stream.

After the slurry is passed through the density separator 47, the light fraction can be recycled to the conditioning cell 27. The heavy fraction may be trans-ported or directed to the froth flotator 48, for example, if the heavy fraction has sufficient oil to justify removal by froth flotation. If the heavy fraction contains a negligible amount of hydrophobic material, it may be transported directly to the tailings dewatering system, which includes the flocculator 60 and the belt press system 58.

The principal function of the froth flotator 48 is to separate the slurry entering the froth flotator into a froth stream and a non-floatable tailings stream. The tailings stream is propelled through line 23 by a pump to a belt press 58 which is conventional in the art. This belt press presses the tailings into filter cakes which are disposed of in a cake drum. The filtrate is disposed of separately.

In the preferred embodiment, there is a flocculator 60 in which the non-flotable tailings stream is flocculated prior to treatment by the belt press 58. In one aspect, this flocculator 60 comprises a pair of polymer mixing tanks 61, 62. Mixing tank 61 is equipped with an electrically powered stirrer or rotor and is used for the mixing of cationic polymers. Mixing tank 62 also is equipped with an electrically powered stirrer and is used to mix anionic polymers. A line is attached to both tanks in such a way that either polymer may be used independently of the other or both polymers may be used in combination to flocculate the tailings stream.

The froth stream is directed through line 24 to a plate and frame filter 64 where it is pressed into dry cakes for disposal. Preferably, this is preceded by a pair of mixing cells 50, 51, one of which is for adding diatomaceous earth, which is used to create a filter coating on the filter cloth, thus providing a means for collecting fine particulates, and helping to avoid media blinding.

In one embodiment, the tailings stream may also be directed to the plate and frame filters 64. If so, then diatomaceous earth is not mixed therewith. The froth filtrate, which typically includes water and hydrophobic liquid material, should be disposed of in an environmentally safe manner.

The preferred embodiment comprises a heat treatment system 66 for treating either the fines coming from the conditioning cell 25 or the low density recycle stream which comes from the conditioning cell 27. Although less preferred, the coarse particles in conditioning cell 26 can also be treated by the heat treatment system 66. Any of these streams may be directed separately or in combination with the others to the heat treatment system 66. A surfactant may be added to these streams during heat treatment. An exit line from the heat treatment system 66 directs the heat-treated slurry to the froth flotator 48 described above. In some cases, the slurry may be directed to the dewatering system, bypassing the froth flotator completely.

Other aspects of the invention include an apparatus for separating oil that is adsorbed to the hydrophilic particles generally present in sludge mixtures. The apparatus comprises a first device, preferably a sieve bin, for separating coarse hydrophilic particles from the rest of the mixture, i.e., the sludge, to which may be added an appropriate amount of water to adjust flowability of the sludge. A second device may be connected to the first device for washing the coarse particles to remove adsorbed oil. The first and second devices may be part of a single component, such as a gravity separator.

In some cases, such as when the sludge includes a large quantity of coarse particles, such coarse particles may be further subdivided into coarse and coarser particles on the basis of size. When the hydrophilic particles are fine, it becomes more difficult to classify them on the basis of size in a gravity separation device. The gravity separator will not take into account the fact that hydrophobic oil adsorbed to the hydrophilic particles makes the particles less dense. Thus, larger particles may be considered less dense because of the adsorbed oil, while smaller particles may be classified as more dense if it is a particle such as sand, which does not tend to adsorb oil easily.

On the other hand, coarser particles can be classified according to size using a gravity separation device. The reason for this is that hydrophobic oil does not occupy as much surface area for a given weight of particles. Thus, gravity separation will be more dependent upon particle size than upon particle density.

An specific embodiment of this invention also involves an apparatus for separating adsorbed oil from hydrophilic particles comprising the first and second devices mentioned above plus a third device connected to the first device for treating the fine particles by froth flotation in order to remove desorbed oil from the mixture. In some cases, this becomes a very important part of the apparatus, such as when coarse particles comprise an insubstantial part of the sludge.

The following example is included for the sole purpose of illustrating various aspects of the invention. It is not to be construed as limiting the invention in any way.

EXAMPLE

In this example, oily sludge from a petroleum refinery waste disposal pit contained about 13 wt.% solid, about 8 wt.% oil and grease and the remainder water. This mixture was mixed for 5 minutes by shaking by hand in a glass cylinder and was allowed to settle for 15 minutes. The coarse and heavy fraction sediment was observed to form at the bottom of the cylinder. The supernatant which included a significant portion of oily sludge and fine particulates was carefully decanted. The sediment was slurried with an equal volume of water and allowed to settle for 5 minutes. The supernatant was then decanted and mixed with the first decanted supernatant. The remaining sediment was isolated for analysis.

Approximately 0.1 g/liter equivalent Dowfroth 420M was added to the supernatant fraction and was mixed. At this point in the process, a surface modifying agent, i.e., sodium silicate, may be added to promote separation of the hydrophobic oil from the fine particles. However, in this example, no such surface modifying agent was used. The mixture was then transferred to a laboratory scale 200-mL capacity flotation cell in which air bubbles were created using compressed air. Due to aeration, a froth was created at the surface of the slurry. The froth was carefully removed periodically until there was no visible particle- or oil-loaded froth seen on the surface. The remaining slurry ("tailing") was transferred into a container and flocculated. The flocculated slurry was then analyzed for oil and grease content, the recovered froth fraction, and the sediment obtained from the sedimentation-decantation process. Analytical results are given in Table 1.

TABLE 1

| | Wt % | | Oil & Grease | |
| --- | --- | --- | --- | --- |
| | Solid | Water | Fraction | % of Total |
| Decanted Sediment | 53.0 | 41.8 | 5.2 | 16.0 |
| Supernatant Fraction: | | | | |
| Froth | 17.0 | 40.8 | 42.2 | 84.0 |
| Tailings | 1.3 | 98.7 | Trace | Trace |
| Oil & Grease Reduction in Substrate = 84 wt. % | | | | |

The foregoing description has been directed to particular embodiments of the invention in accordance with the requirements of the United States patent statutes for the purposes of illustration and explanation. It will be apparent to those skilled in this art, however, that many modifications and changes in the apparatus and methods set forth will be possible without departing from the scope and spirit of the invention. It is intended that the following claims be interpreted to embrace all such modifications and changes.

What is claimed is:

1. A separation apparatus, comprising:
    a size separator for separating a mixture of hydrophoboic oil, solid particulates, and water into a fines fraction and a coarse fraction; wherein the fines fraction includes under-sized particles, hydrophobic oil, and water; and wherein the coarse fraction includes over-sized particles;
    a hydrocyclone connected to the size separator for separating the fines fraction into a low density fraction a high density fraction; and
    a froth flotator connected to the hydrocyclone for separating the low density fraction into a substantially hydrophobic component and a substantially hydrophilic component.

2. An apparatus as recited in claim 1 additionally comprising a device for washing the coarse fraction with water to promote the release of oil absorbed to the over-sized particles.

3. An apparatus as recited in claim 1 wherein the size separator includes a separator screen and a water rinser.

4. An apparatus as recited in claim 3 additionally comprising a trash screen for removing particles, wherein the trash screen apertures are larger than the separator screen apertures.

5. An apparatus for removing substantially hydrophobic materials from an oily sludge, comprising:
    a size separator for receiving the oily sludge and for separating the oily sludge into a coarse fraction and a fines fraction; wherein the coarse fraction includes over-sized particles and wherein the fines fraction includes under-sized particles, hydrophoboic materials, and water;
    a conditioning tank connected to the size separator including two cells, wherein the first cell receives and holds the fines fraction and wherein the second cell receives and holds the coarse fraction;
    a gravity separator connected to the conditioning tank for receiving the fines fraction delivered from the first cell and for separating the fines fraction into a high density fraction and a low density fraction;
    a froth flotator connected to the conditioning tank for receiving the low density fraction from the gravity separator and for separating the low density fraction into a substantially hydrophobic component and a substantially hydrophilic component;
    a heat treatment device connected to the conditioning tank for receiving the fines fraction delivered from the first cell or for receiving the low density fraction delivered from the gravity separator; and
    means for delivering said fines fraction and said low density fraction from said heat treatment device to said froth flotator.

6. An apparatus as recited in claim 5 wherein the gravity separator is a hydrocyclone.

7. The apparatus of claim 5 additionally comprising a flocculator connected to the froth flotator for flocculating the substantially hydrophilic component.

8. An apparatus for separating absorbed oil from hydrophilic particles in a mixture, comprising:
    a first device for separating coarse hydrophilic particles from the mixture;

a second device connected to the first device for washing the coarse particles to remove absorbed oil from the coarse particles;

a third deivce comprising a hydrocyclone for dividing the mixture into a high density component and a low density component; and a fourth device connected to the first device for treating the fine particles by froth flotation to remove desorbed oil.

9. A separation apparatus for separating a mixture of hydrophobic oil, water, and solid particulates which have a wide range of particle sizes, said solid particulates including relatively large particles and relatively small particles, said apparatus comprising:

a density separator for separating the said particulates of said mixture into only two component and high density component, said low density and high density components both comprising solid particulates having different densities;

means for directing said mixture to said density separator;

means for removing said relatively large particles from said mixture before said mixture is directed to said density separator; and a froth flotator connected to said density separator for receiving the low density component and for separating the low density materials into a substantially hydrophobic component and a substantially hydrophilic component.

* * * * *

UNITED STATES PATENT AND TRADEMARK OFFICE
CERTIFICATE OF CORRECTION

PATENT NO. : 5,006,239
DATED : April 9, 1991
INVENTOR(S) : Surendra K. Mishra

It is certified that error appears in the above-indentified patent and that said Letters Patent is hereby corrected as shown below:

Col. 4, line 56, please replace "hydrophilicp" with --hydrophilic--.

Col. 5, line 18, after "content," change "ma" to --may--.

Col. 12, line 14, please change "fraction a high" to read --fraction and a high--.

Col. 12, line 21, please change "oil absorbed" to read --oil adsorbed--.

UNITED STATES PATENT AND TRADEMARK OFFICE
CERTIFICATE OF CORRECTION

PATENT NO. : 5,006,239
DATED : April 9, 1991
INVENTOR(S) : Surendra K. Mishra

It is certified that error appears in the above-indentified patent and that said Letters Patent is hereby corrected as shown below:

Col. 14, line 2, please change "two component" to read --two components which consist of a low density component--.

Col. 5, line 59, please change "the adsorption..." to read --the desorption--.

Col. 10, line 48, please change "preferably a sieve bin," to read --preferably a sieve bend--.

Signed and Sealed this

Third Day of January, 1995

*Attest:*

*Attesting Officer*

BRUCE LEHMAN

*Commissioner of Patents and Trademarks*